United States Patent
Ali et al.

(10) Patent No.: US 9,953,079 B2
(45) Date of Patent: Apr. 24, 2018

(54) PREFERENCE BASED SYSTEM AND METHOD FOR MULTIPLE FEED AGGREGATION AND PRESENTATION

(71) Applicant: International Business Machines Corporation, Armonk, NY (US)

(72) Inventors: Sherif Magdy Mohamed Mahmoud Ali, Cairo (EG); Ola Abdelwahab Dessouky Ahmed Elabbady, Cairo (EG); Hisham Emadeldin Elshishiny, Cairo (EG); Sherif Sabry, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/028,564

(22) Filed: Sep. 17, 2013

(65) Prior Publication Data
US 2015/0081670 A1    Mar. 19, 2015

(51) Int. Cl.
*G06F 17/30* (2006.01)
*H04L 12/58* (2006.01)

(52) U.S. Cl.
CPC .. *G06F 17/30699* (2013.01); *G06F 17/30716* (2013.01); *G06F 17/30991* (2013.01); *H04L 51/12* (2013.01); *H04L 51/14* (2013.01); *H04L 51/32* (2013.01)

(58) Field of Classification Search
CPC ......... G06F 17/30699; G06F 17/30716; G06F 17/30991; G06F 17/30489; G06F 17/273; G06F 17/278; G06Q 50/01; H04L 51/32; H04L 51/12; H04L 51/14
See application file for complete search history.

(56) References Cited

U.S. PATENT DOCUMENTS

| 6,047,299 A | * | 4/2000 | Kaijima | G06F 17/273 704/10 |
| 9,208,252 B1 | * | 12/2015 | Cooley | G06F 17/30867 |
| 9,258,231 B2 | * | 2/2016 | Dheap | H04L 47/10 |

(Continued)

FOREIGN PATENT DOCUMENTS

| CN | 101297567 A | 10/2008 |
| CN | 102713965 A | 10/2012 |
| CN | 104462173 A | 3/2015 |

OTHER PUBLICATIONS

IPCOM000213630D, (2011). Reducing Social Network Hyperactivity, available at: http://ip.com/IPCOM/000213630: See section II, p. 1.

(Continued)

*Primary Examiner* — Robert Beausoliel, Jr.
*Assistant Examiner* — Arthur Ganger
(74) *Attorney, Agent, or Firm* — Alexis N. Hatzis

(57) ABSTRACT

A computer system for improving the presentation of social media data from multiple social network feeds is provided. The computer system may include aggregating social media content received from the multiple social network feeds. The computer system may also include generating filtered data by eliminating repetitive data from among the received aggregated social media content. The computer system may further include analyzing the filtered data for determining at least one data category and presenting a digest of social media content based on the determined at least one data category.

9 Claims, 4 Drawing Sheets

(56) References Cited

U.S. PATENT DOCUMENTS

| | | | |
|---|---|---|---|
| 2002/0152283 A1* | 10/2002 | Dutta | G06F 17/30896 709/218 |
| 2004/0192382 A1 | 9/2004 | Hashimoto et al. | |
| 2005/0060365 A1* | 3/2005 | Robinson | H04L 69/329 709/203 |
| 2006/0168126 A1* | 7/2006 | Costa-Requena | H04L 12/2803 709/219 |
| 2006/0173985 A1* | 8/2006 | Moore | 709/223 |
| 2007/0207794 A1* | 9/2007 | Dunko | H04W 8/22 455/419 |
| 2011/0004831 A1 | 1/2011 | Steinberg et al. | |
| 2011/0047229 A1 | 2/2011 | Sinha et al. | |
| 2011/0106807 A1* | 5/2011 | Srihari | G06F 17/30604 707/739 |
| 2011/0119239 A1 | 5/2011 | Jabaud et al. | |
| 2011/0179020 A1* | 7/2011 | Ozzie | G06F 17/3089 707/723 |
| 2012/0117475 A1 | 5/2012 | Lee et al. | |
| 2013/0021370 A1 | 1/2013 | Dunn et al. | |
| 2013/0041901 A1* | 2/2013 | Nikankin | 707/737 |
| 2013/0097236 A1 | 4/2013 | Khorashadi et al. | |
| 2013/0110978 A1 | 5/2013 | Gordon et al. | |
| 2013/0122934 A1 | 5/2013 | Branch et al. | |
| 2013/0159885 A1 | 6/2013 | Yerli | |
| 2015/0081674 A1 | 3/2015 | Ali et al. | |

OTHER PUBLICATIONS

Mika, "Flink: Semantic Web technology for the extraction and analysis of social networks", Web Semantics: Science, Services and Agents on the World Wide Web 3 (2005), pp. 211-223, www.sciencedirect.com.

Rahm et al. "Data Cleaning: Problems and Current Approaches", University of Leipzip, Germany, Copyright 2000 IEEE. http://dbs.uni-leipzig.de. pp. 1-11.

Razmerita et al. "Towards a New Generation of Social Networks: Merging Social Web with Semantic Web" Proceedings of I-KNOW '09 and I-SEMANTICS '09, Sep. 2-4, 2009, Graz, Austria. pp. 412-423.

* cited by examiner

PREFERENCE BASED SYSTEM AND METHOD FOR MULTIPLE FEED AGGREGATION AND PRESENTATION

FIELD OF THE INVENTION

The present invention relates generally to the field of social networking using a computer on a communication network, and more particularly to improving the quality, relevance and form of the content delivered along with its impact on delivery bandwidth.

BACKGROUND

A social networking service is an online service, platform, or site that focuses on facilitating the building of social networks or social relations among people who, for example, share interests, activities, backgrounds, or real-life connections. A social network service consists of a representation of each user, i.e., a profile, the user's social links, and a variety of additional services. Most social network services are web-based and provide means for users to interact over the Internet, such as e-mail and instant messaging. Social networking sites allow users to share ideas, activities, events, and interests within their individual networks.

Social media depends mainly on user driven content, which is a defining characteristic of the Social Web. As a result, large amounts of data flow through these social network channels daily. However, relevant content received by a user may be buried in low-quality information. For example, users may receive a large amount of content that the user is not interested in receiving. As such, users may quickly find themselves inundated with irrelevant voluminous content that they cannot control. This is especially problematic for users of mobile networks who are trying to limit the cost of their data usage via their smart phones.

SUMMARY

A method for improving the presentation of social media data from multiple social network feeds is provided. The method may include aggregating social media content received from the multiple social network feeds. The method may also include generating filtered data by eliminating repetitive data from among the received aggregated social media content. The method may further include analyzing the filtered data for determining at least one data category and presenting a digest of social media content based on the determined at least one data category.

A computer system for improving the presentation of social media data from multiple social network feeds is provided. The computer system may include aggregating social media content received from the multiple social network feeds. The computer system may also include generating filtered data by eliminating repetitive data from among the received aggregated social media content. The computer system may further include analyzing the filtered data for determining at least one data category and presenting a digest of social media content based on the determined at least one data category.

A computer program product for improving the presentation of social media data from multiple social network feeds is provided. The computer program product may include aggregating social media content received from the multiple social network feeds. The computer program product may also include generating filtered data by eliminating repetitive data from among the received aggregated social media content. The computer program product may further include analyzing the filtered data for determining at least one data category and presenting a digest of social media content based on the determined at least one data category.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
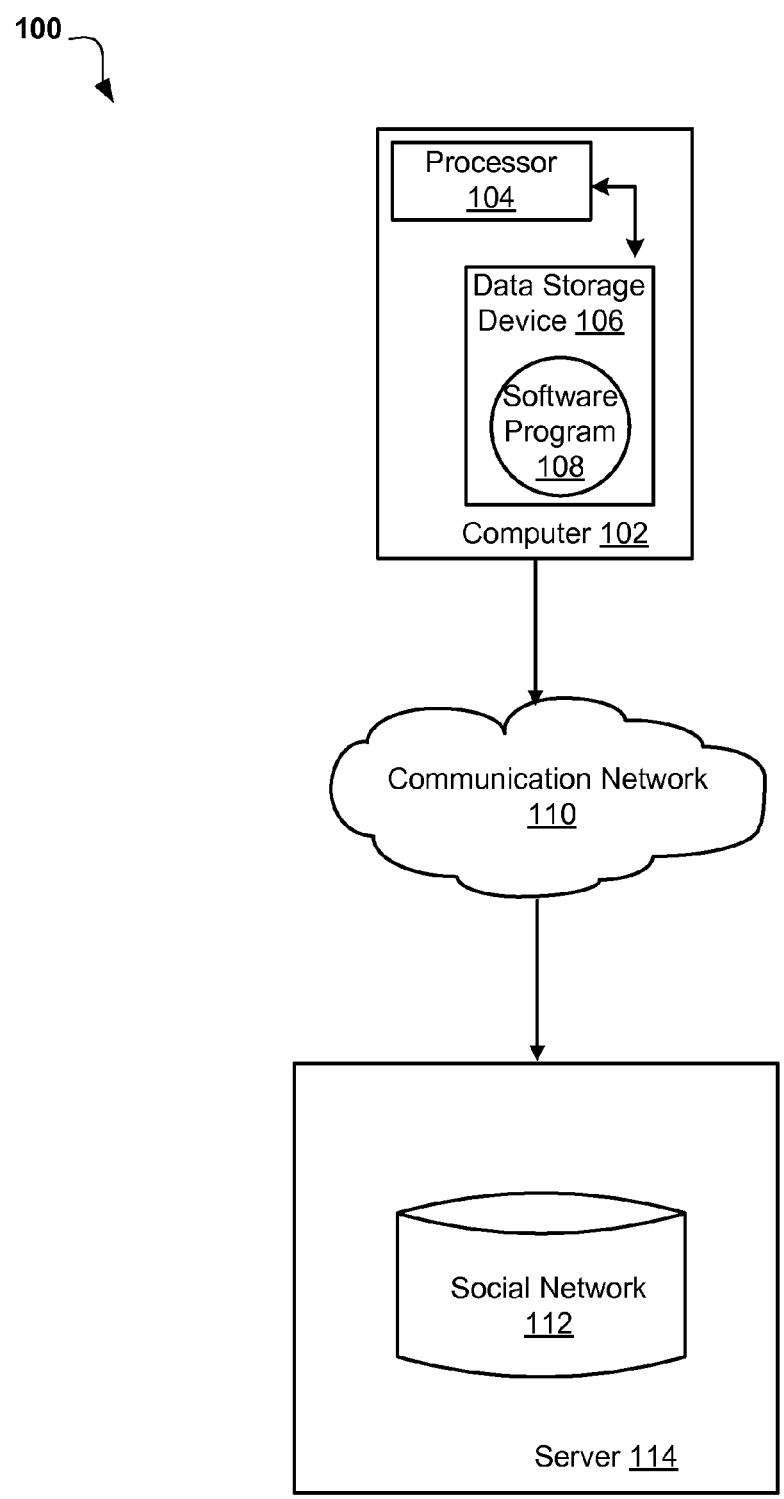
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of social networking using a computer on a communication network, and more particularly to improving the content delivered to a user along with its impact on delivery bandwidth. The following described exemplary embodiments provide a system, method and program product for improving the quality, relevance and form of the content delivered to a user along with its impact on delivery bandwidth.

As previously described, social media mainly depends on user driven content and as such, large amounts of data flow through these social network channels daily. However, since the content is becoming more poorly structured, relevant content may be buried in low-quality information and users may quickly find themselves inundated with irrelevant voluminous content that they cannot control. This may be especially problematic for users of mobile networks who are trying to limit the cost of their data usage via their smart phones.

Currently, there are a number of technical approaches to address these problems. Some solutions focus on the extraction, aggregation, cleaning and visualization for data coming from multiple data sources such as databases or feeds from social networks. For example, data quality problems are currently being addressed by data cleaning. Some techniques may be used that allow users to improve the quality of data and handle cases where data is misrepresented (e.g., spelling mistakes), redundant or has different presentations. Other current techniques being explored involve the usage of semantic web techniques for the analysis of social network and the extraction of knowledge from existing data with a focus on topics such as trust and reputation.

However, with respect to these current technical approaches, the user has no control over the data representation delivered to the user. Additionally, the variability in the user's data usage constraints is not taken into consideration. Furthermore, topics' identification and content filtering are not dynamically based on the user's current timeline and location.

According to at least one embodiment of the present invention, data is gathered from different social networks and processed in a way that reduces clutter and improves the content quality while controlling and reducing data usage over mobile networks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for improving the quality, relevance and form of the content delivered to the user along with its impact on delivery bandwidth.

According to at least one embodiment of the present invention, a repository of user profiles and preferences may be utilized. The repository may contain all of the user's social media accounts that the user wishes to keep track of, the user's list of interests in a prioritized manner and the user's preferences regarding the delivery method of this content (i.e., size limitation or preferable formats). Additionally, at least one embodiment of the present invention may provide another stage of filtering which may be performed at "runtime" and based on the current snapshot of the timeline on different social networks, the filtered content is categorized and presented to the user so the user may choose the desired topics, the user wishes to consult.

Embodiments of the present invention may include the following main components: A preference repository database, an entities repository database, a proxy and a digest. The preference repository database may comprise of the user preferences related to quality and presentation of content to be delivered. The entities repository database may store entities' name (i.e., a person, a place, a thing, or an event) aggregated with all its possible representations, synonyms, and known names all linked to a single entity ID (i.e., user-identifier).

The proxy may intercept the content to be transferred to the user from different social network providers, process it and transmit an adapted content to the end user smart phone or computer based on the user preferences. The content may be presented to the user in the form of a digest respecting the user preferences and categorized by topic.

Embodiments of the present invention may allow the user to control the filter the user wishes to apply on the content received, in order to reduce data usage rather than imposing a specific constrain over size or type of media (as in the current methods being utilized). Additionally, embodiments of the present invention may be implement in a two-stage filtering mechanism that accounts for general preferences guidelines relating to media type and size as set in the preference repository and specific topics or events available at the time the service is requested.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a social network 112, a server 114 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with social network 112 running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a social network.

As previously described, the client computer 102 may access social network 112, running on server computer 114 via the communications network 110. For example, a user using an application program 108 (e.g., FIREFOX®) (FIREFOX® and all FIREFOX®-based trademarks and logos are trademarks or registered trademarks of MOZILLA® and/or its affiliates) running on a client computer 102 may connect via a communication network 110 to one of their social network accounts 112 which may be running on server computer 114.

Figure 2:
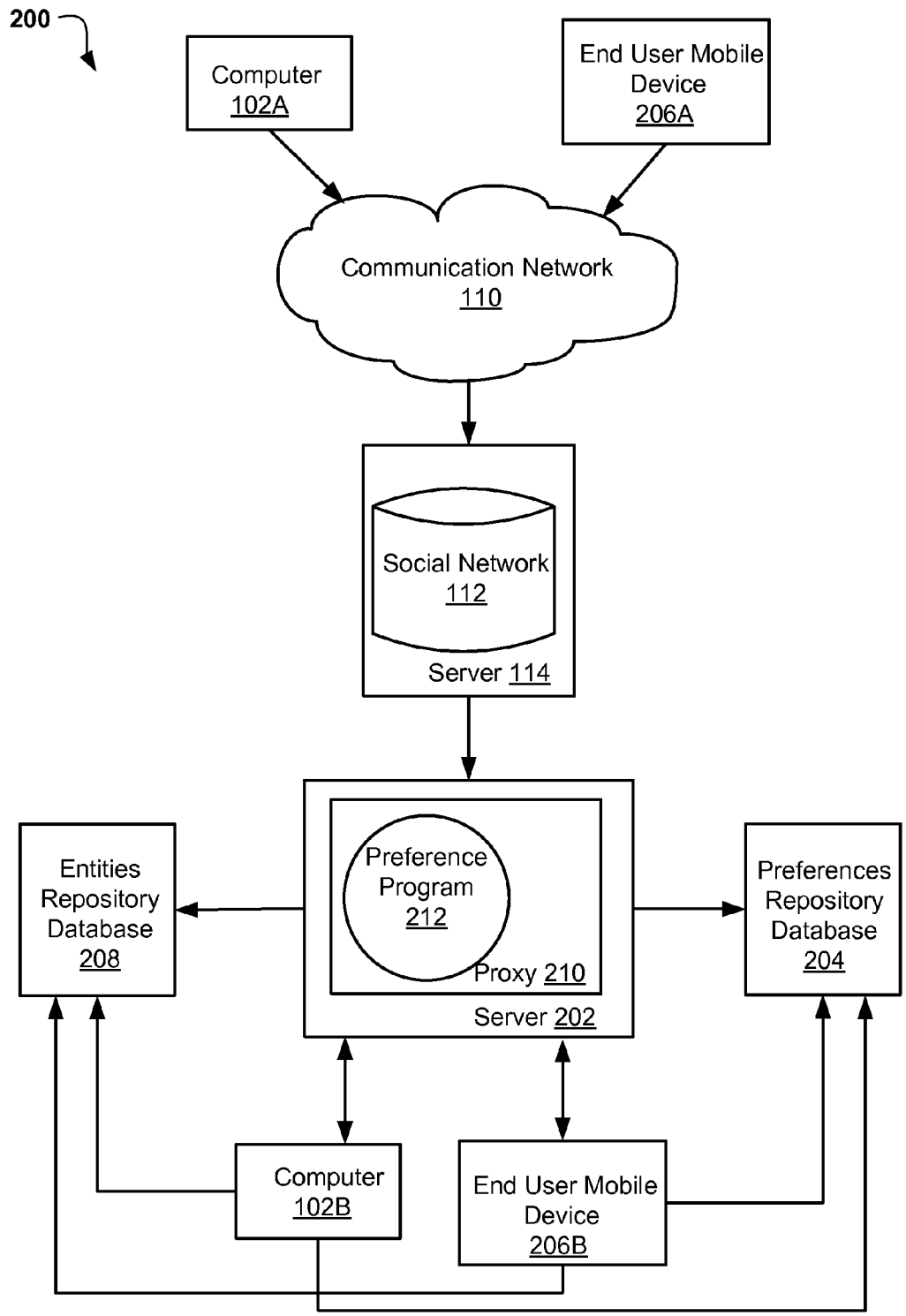
FIG. 2 illustrates a networked computer environment with an exemplary program to improve the information content delivered to a user and improve the impact on delivery bandwidth of such content.

Referring now to FIG. 2, a networked computer environment with an exemplary proxy 210 and a preference program 212 to improve the information content delivered to a user and improve the impact on delivery bandwidth of such content in accordance with one embodiment is depicted. Preference program 212 may be implemented as running on a server 202, computer 102B, or an end user mobile device 206B. However, for example purposes only, preference program 212 is depicted as running on server 202. Client computer 102A and end user mobile device 206A may communicate via a communication network 110 with a social network 112 which may be running on a server computer 114. Proactively improving the information content delivered to a user on a computer 102B or an end user mobile device 206B and improving the impact on delivery bandwidth of such content in accordance with at least one embodiment may be implemented as preference program 212 and proxy 210 running on server 202 interacting with social network 112 running on server 114. Proxy 210 running on server 202 may also interact with an entities repository database 208 and a preferences repository database 204.

Preference program 212 may be a computer program that improves the information content delivered to a user on an end user mobile device 206B or computer 102B and improves the impact on delivery bandwidth of such content from a social network 112, such as, TWITTER® (TWITTER® and all TWITTER®-based trademarks and logos are trademarks or registered trademarks of TWITTER® and/or its affiliates) or FACEBOOK® (FACEBOOK® and all FACEBOOK®-based trademarks and logos are trademarks or registered trademarks of FACEBOOK® and/or its affiliates). Proxy 210 may receive user requests from a computer 102A, collect data from different social media services' providers on a social network 112 and preference program 212 may perform a series of steps (which will be explained in detail below with respect to FIG. 3) on the received feeds before sending the content to the users on their end user mobile device 206B or their computer 102B.

Preferences repository database 204 may store the user profiles for subscribers of the proxy 210 service and hold their social media subscriptions (e.g. FACEBOOK®, TWITTER®, etc.) along with their preferences. The preferences repository database 204 may provide filter configuration which may be topic filtering based on the context or situation when presented in a digest. Interest preferences may be entered as tags and stored as entity IDs (i.e., user-identifiers) into the preferences repository database's 204 underlying storage. Additionally, delivery preferences may be stored. Delivery preferences may be preferences that relate to the delivery format, such as maximum bandwidth consumption allowed, preferable data format (i.e., text, images, and videos). Furthermore, the entities repository database 208 may store entities' name (i.e., a person, a place, a thing, or an event) aggregated with all its possible representations, synonyms, and known names all linked to a single entity ID (i.e., user identifier).

According to at least one embodiment, users may login to the preference repository database 204 (FIG. 2) to establish and maintain a user profile (i.e., a set of user-defined preferences associated with the social media data). Once the user profiles are set, the preferences may be pushed to the proxy 210 (FIG. 2) for future content filtering. When the user needs to access the service, a service request may be made to the proxy 210 (FIG. 2). Then the proxy 210 (FIG. 2) may connect to the service providers for the social networks 112 (FIG. 1) the user subscribed to 112 (FIG. 1) and the raw content may be provided to the proxy 210 (FIG. 2) from the different social network providers 112 (FIG. 1) associated with the user. Then the proxy 210 (FIG. 2) may process the content merged from all sources and filters it based on the user preferences and may be presented as a digest categorized by topic on the end user's mobile device 206B (FIG. 2) or computer 102B (FIG. 2).

Figure 3:
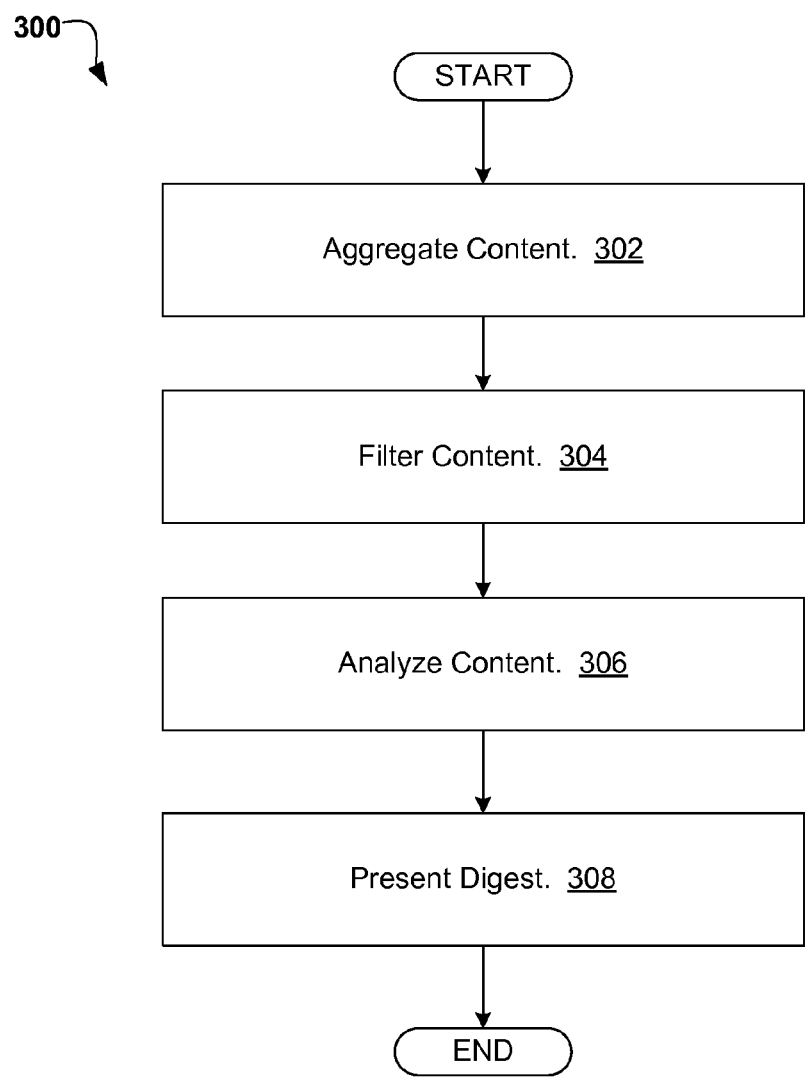
FIG. 3 is an operational flowchart illustrating the steps carried out by a program to improve the information content delivered to a user and improve the impact on delivery bandwidth of such content.

Referring now to FIG. 3, an operational flowchart illustrating the steps carried out by a preference program 212 (FIG. 2) to improve the information content delivered to a user and improve the impact on delivery bandwidth of such content is depicted. As previously stated the method may be implemented by utilizing a preference repository 204 (FIG. 2), an entities repository database 208 (FIG. 2), a proxy 210 (FIG. 2) and a digest. The preference repository 204 (FIG. 2) may comprise of the user-defined preferences related to quality and presentation of content to be delivered. The proxy 210 (FIG. 2) may intercept the content to be transferred to the user from different social network providers, process it and transmit an adapted content to the end user smart phone 206B (FIG. 2) or computer 102B (FIG. 2) based on the user preferences. The content may be presented to the user in the form of a digest respecting the user preferences and categorized by topic.

At 302, the content is aggregated, (i.e., the feeds are merged). For example, different feeds coming in from different social networks 112 (FIG. 1) are merged into one timeline and the social network credentials are kept as part of the user profile in the preferences repository database 204 (FIG. 2).

Then at 304, the content is filtered (i.e., cleanup data) and the entries may be analyzed to eliminate (i.e., merge or delete) repetitive data. One implementation may be to detect and remove exact matches (i.e., data that is pointing to the same link and has the same file signature). Another implementation may be to detect similar feeds and aggregate them in a single entry utilizing a meta database (i.e., entities repository database 208 (FIG. 2)) that contains all spelling variations and known names of entities, where all different single entity mentions are replaced by a unique ID (i.e., user-identifier). Then, based on this ID, redundant feeds and feeds under the same event may be identified. The identified same event ID may be attached to the feed as metadata. Another implementation may be that feeds repeated from different sources within a network or from different feed sources are augmented such that the feed contents itself is kept intact while information regarding the source, such as IDs, geotags and timestamps may be attached as metadata.

Next, at 306, the content is analyzed (i.e., the data is categorized). For example, categorization may be deduced by analyzing patterns within the feeds into two main types (i.e., data categories). One type may be permanent categories (such as sports, culture, etc.) which may be identified by relevant category keywords or user-identifiers (i.e., IDS), timestamps and geo-tags. The permanent categories may be categories that the user wishes to receive information about on a permanent basis. The permanent categories may remain as a user-defined preference until the user changes the permanent categories. Another type may be temporary categories that represent an event, such as a live sporting event, identified by meta data information (i.e., same user-identifiers (i.e., IDS), timestamps and geo-tags within narrow intervals). With respect to the temporary category, there may be a link between two entities that is valid only for a certain amount of time. For example, there may be a link between two teams involved in a sporting game. Once the game (i.e., the live sporting event) has finished, the link may no longer be valid.

Additionally, in case of tight data constraints, using data roaming or a slow connection, one implementation of the present embodiment may allow the user to request (in the user's preferences) to receive a single instance from temporary categories (i.e., the most frequent one within the category). An example of this may be a live picture of a goalie scoring a goal at a soccer game. According to one implementation of the present embodiment, if the user has tight data limits, then the user may request to receive a single instance of an event. With respect to the soccer example, the user may wish to receive one picture depicting the goalie scoring a goal at the live soccer game. As such, geo-tags (i.e., geographical location tag), IDS (i.e., user-identifiers) of the name of the picture and timestamps (i.e., time the picture was taken) may be taken into account. Regarding the soccer example, geo-tags of the location of the stadium, IDs describing a similar name of the picture (e.g. team name) and timestamps showing approximately the same time the picture was taken may be taken into consideration in determining multiple instances of the same event (i.e., involving the same context). Therefore, the user may receive one picture of a particular time during the soccer game as opposed to receiving multiple instances of the same picture. Furthermore, the number of feeds coming under a certain category may be analyzed to aid in trend detection. For example, if a large number of feeds are being associated with a certain category, such as cooking, then this may aid in determining if a trend is occurring with respect to that particular category.

At 308, the digest is presented based on the data size, data type and data categories (i.e., applying data presentation preferences) to the user via the end user's mobile device 206B (FIG. 2) or computer 102B. According to one implementation of the present embodiment, data size preferences are stored in a preferences repository 204 (FIG. 2). This may act as a first stage of filtering performed on the content based on the user preferences. Data size preferences may define how the data will be presented to the user depending on their bandwidth or connection speed. One implementation may be to display a text representation rather than images (e.g. image alternate tag or image name) when the user's data plan has tight data constrains, using data roaming or has a slow connection. Another implementation may be for data size preferences to be enabled contextually according to a profile (i.e., when a user is roaming) or based on a time schedule. Additionally, data size preferences and data type preferences may be used collaboratively to remove uninteresting feeds from the timeline.

According to another embodiment of the present invention, a digest of filtered content may be created and presented to the user grouped by categories or events as identified by the previously described component. Then, based on the above, a second stage of filtering may be applied based on the user to select the categories that are most relevant to the user.

Figure 4:
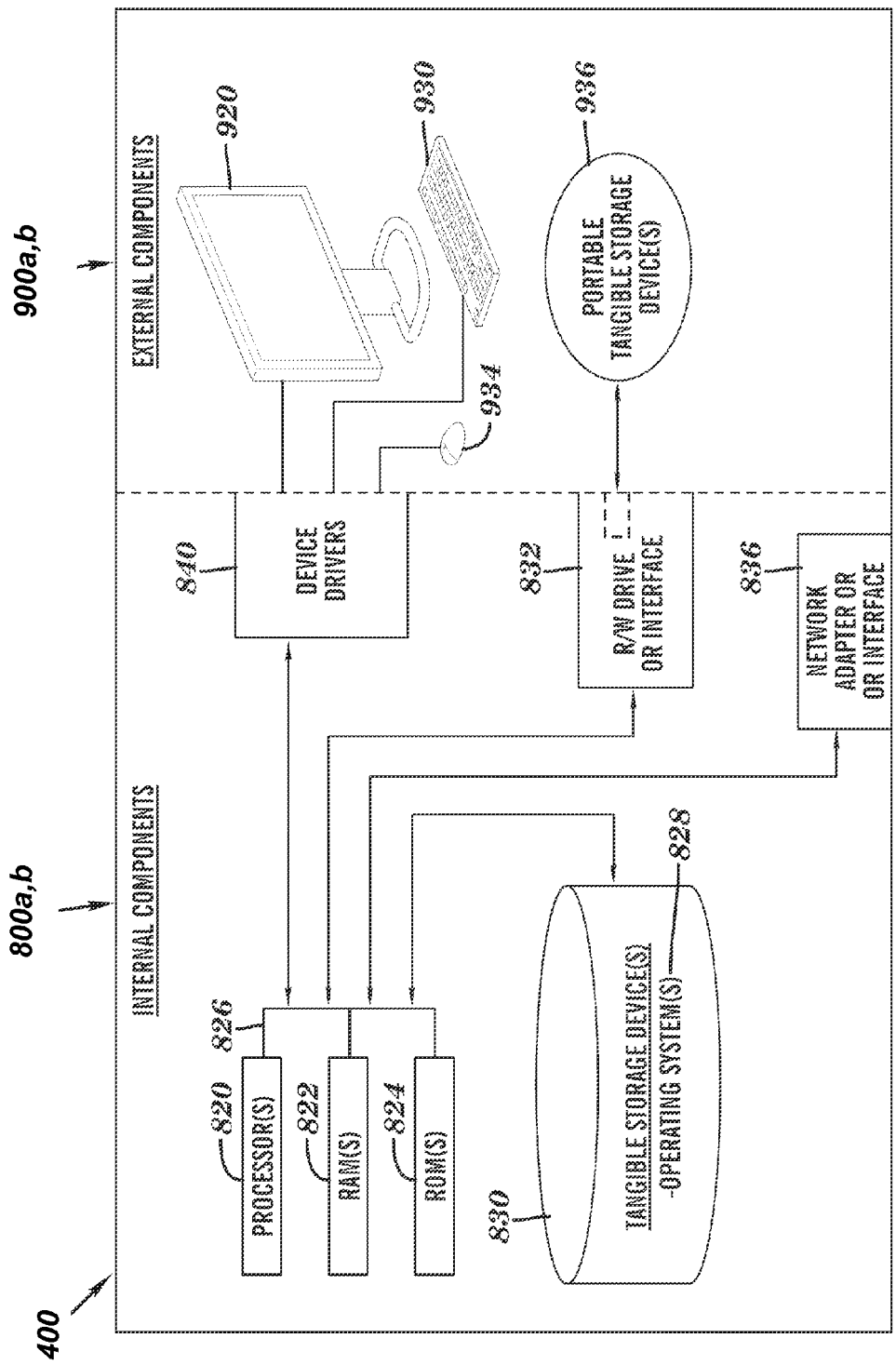
FIG. 4 is a block diagram of internal and external components of computers and servers depicted in FIG. 1.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 114 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108, such as the proxy 210, can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless wi-fi interface cards, or 3G or 4G wireless interface cards or other wired or wireless communication links. The program 108 in client computer 102 and proxy 210 in network server 202 can be downloaded to client computer 102 from an external computer via a network (for example, the Internet, a local area network or other, wide area network) and respective network adapters or interfaces 836. From the network adapters or interfaces 836, the program 108 in client computer 102 and the proxy 210 in network server computer 114 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for improving the presentation of social media data from multiple social network feeds, comprising:

one or more hardware processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

aggregating social media content received from the multiple social network feeds;

generating a first stage of filtered data by eliminating repetitive data from among the received aggregated social media content, wherein eliminating repetitive data comprises:

detecting a plurality of similar feeds within the multiple social network feeds;

aggregating the plurality of similar feeds in a single entry, wherein aggregating the plurality of similar feeds comprises utilizing a meta database that contains a plurality of spelling variations and known names of entities, wherein a plurality of different single entity mentions is mapped to a unique identifier in the meta database;
replacing each spelling variation and each known name entity within the plurality of spelling variations and known names of entities with the mapped unique identifier;
attaching the mapped unique identifier to metadata associated with each feed within the plurality of similar feeds;
attaching a user-ID, a geotag, and a timestamp as metadata associated with each feed within the plurality of similar feeds, wherein the user-ID is a name describing the feed, the geotag is a location where the feed was generated, and the timestamp is a time when the feed was created;
identifying a plurality of redundant feeds and a plurality of similar feeds within the plurality of similar feeds based on the attached mapped unique identifier and based on the attached user-ID, the attached geotag, and the attached timestamp; and
adding one redundant feed within the identified plurality of redundant feeds and one similar feed within the identified plurality of similar feeds to the first stage of filtered data;
analyzing the first stage of filtered data for determining at least one data category;
presenting a first digest of social media content based on the determined at least one data category;
in response to a user selecting a plurality of categories from the presented first digest of social media content, generating a second stage of filtered data to the user;
presenting a second digest of social media content based on the generated second stage of filtered data and based on a bandwidth and a connection speed of a mobile device associated with the user;
generating a set of user-defined preferences, wherein the at least one data category is determined based on applying the user-defined preferences during the analyzing of the filtered data,
wherein the set of user-defined preferences comprises delivery preferences including delivery format, wherein the delivery format is selected from the group consisting of text, images, and videos; and
adding the set of user-defined preferences to a preference repository database.

2. The computer system of claim 1, wherein the eliminating of the repetitive data comprises merging or deleting repetitive data from the received aggregated social media content.

3. The computer system of claim 1, wherein the generating of the first stage of filtered data comprises utilizing a preference repository database and an entities repository database.

4. The computer system of claim 1, wherein the at least one data category comprises at least one of a permanent category and a temporary category and is identified by meta data including user-identifiers, timestamps, and geo-tags with narrow intervals.

5. The computer system of claim 4, wherein the temporary category comprises temporary changes to a set of user-defined preferences including delivery content and delivery format.

6. The computer system of claim 1, wherein the presentation of the digest comprises utilizing at least one of data size; data type; and data category.

7. The computer system of claim 1, wherein the delivery preferences comprise a preference to display a text-only representation of data associated with an image.

8. A computer program product for improving the presentation of social media data from multiple social network feeds comprising:
one or more non-transitory computer-readable storage devices and program instructions stored on at least one of the one or more non-transitory computer-readable storage devices, the program instructions executable by a processor, the program instructions comprising:
program instructions to aggregate social media content received from the multiple social network feeds;
program instructions to generate a first stage of filtered data by eliminating repetitive data from among the received aggregated social media content, wherein eliminating repetitive data comprises:
program instructions to detect a plurality of similar feeds within the multiple social network feeds;
program instructions to aggregate the plurality of similar feeds in a single entry, wherein aggregating the plurality of similar feeds comprises utilizing a meta database that contains a plurality of spelling variations and known names of entities, wherein a plurality of different single entity mentions is mapped to a unique identifier in the meta database;
program instructions to replace each spelling variation and each known name entity within the plurality of spelling variations and known names of entities with the mapped unique identifier;
program instructions to attach the mapped unique identifier to metadata associated with each feed within the plurality of similar feeds;
program instructions to attach a user-ID, a geotag, and a timestamp as metadata associated with each feed within the plurality of similar feeds, wherein the user-ID is a name describing the feed, the geotag is a location where the feed was generated, and the timestamp is a time when the feed was created;
program instructions to identify a plurality of redundant feeds and a plurality of similar feeds within the plurality of similar feeds based on the attached mapped unique identifier and based on the attached user-ID, the attached geotag, and the attached timestamp; and
program instructions to add one redundant feed within the identified plurality of redundant feeds and one similar feed within the identified plurality of similar feeds to the first stage of filtered data;
program instructions to analyze the first stage of filtered data for determining at least one data category;
program instructions to present a first digest of social media content based on the determined at least one data category;
in response to a user selecting a plurality of categories from the presented first digest of social media content, program instructions to generate a second stage of filtered data to the user;
program instructions to present a second digest of social media content based on the generated second stage of filtered data and based on a bandwidth and a connection speed of a mobile device associated with the user;
program instructions to generate a set of user-defined preferences, wherein the at least one data category is determined based on applying the user-defined preferences during the analyzing of the filtered data, wherein the set of user-defined preferences comprises delivery preferences including delivery format, wherein the delivery format is selected from the group consisting of text, images, and videos; and program instructions to add the set of user-defined preferences to a preference repository database.

9. The computer program product of claim 8, wherein the eliminating of the repetitive data comprises merging or deleting repetitive data from the received aggregated social media content.

* * * * *